United States Patent [19]
Stiglianese

[11] Patent Number: 5,735,403
[45] Date of Patent: Apr. 7, 1998

[54] APPARATUS FOR REMOVAL OF FINE PARTICLES IN MATERIAL FLOW SYSTEM

[76] Inventor: Michael L. Stiglianese, 777 Annoreno Dr., Addison, Ill. 60101

[21] Appl. No.: 408,379

[22] Filed: Mar. 22, 1995

[51] Int. Cl.$^6$ .................................................. B07B 9/00
[52] U.S. Cl. ........................ 209/23; 209/25; 209/143; 209/250; 55/459.1
[58] Field of Search .......................... 209/21, 22, 23, 209/24, 25, 28, 29, 37, 142, 143, 250, 393, 394, 395, 722; 55/435, 459.1

[56] References Cited

U.S. PATENT DOCUMENTS

| | | | |
|---|---|---|---|
| 1,680,243 | 8/1928 | Becker | 209/23 X |
| 2,216,254 | 10/1940 | Schweitzer, Jr. | 209/127.4 |
| 2,934,794 | 5/1960 | Golden | 209/722 X |
| 3,409,411 | 11/1968 | Mosley et al. | 209/23 X |
| 3,446,355 | 5/1969 | Boucraut et al. | 209/20 X |
| 3,489,279 | 1/1970 | St. John | 209/379 X |
| 3,513,642 | 5/1970 | Cornett | 209/23 |
| 3,561,824 | 2/1971 | Homan | 55/429 X |
| 3,672,503 | 6/1972 | Mark | 209/722 |
| 3,682,302 | 8/1972 | Bernutat | 209/150 X |
| 3,693,791 | 9/1972 | Beck | 290/710 |
| 4,211,641 | 7/1980 | Jäger | 209/146 X |
| 4,269,701 | 5/1981 | Hock et al. | 209/23 |
| 4,406,671 | 9/1983 | Rozmus | 209/127.1 X |
| 4,599,016 | 7/1986 | Medemblik | 55/345 X |
| 5,006,018 | 4/1991 | Depew | 406/18 |
| 5,188,239 | 2/1993 | Stowe | 209/223.1 |
| 5,252,008 | 10/1993 | May, III et al. | 209/39 X |
| 5,289,921 | 3/1994 | Rodrigo et al. | 209/138 X |
| 5,289,922 | 3/1994 | Inculet et al. | 209/127.1 |

FOREIGN PATENT DOCUMENTS

| | | | |
|---|---|---|---|
| 1023302 | 1/1958 | Germany | 209/23 |
| 644549 | 1/1979 | U.S.S.R. | 209/23 |

Primary Examiner—William E. Terrell
Assistant Examiner—Tuan N. Nguyen
Attorney, Agent, or Firm—Sonnenschein Nath & Rosenthal

[57] ABSTRACT

A particle separator for use in a material flow system having an airflow generator to generate a flow of air to provide supply material having coarse and fine particulate material to the particle separator. The particle separator includes a housing having a top portion and a bottom portion and a longitudinal axis extending from a center of the top portion to a center of the bottom portion and a chamber defined within the housing. An inlet disposed towards the top portion of the housing is in communication with the flow of air and the supply material and is in further communication with the chamber. It is adapted to direct the flow of air and the supply material into the chamber. The chamber is adapted to facilitate swirling of the airflow and the supply material within the chamber. A cone-shaped air rotation circulator is in communication with the chamber and is configured to facilitate the flow of air directed into the chamber in a circular motion within the chamber. A selectively permeable particle screen is disposed within the chamber and is adapted to separate the fine particles from the coarse particles by permitting the fine particles to pass therethrough while the coarse particles do not pass therethrough. An exhaust outlet in communication with the chamber and the housing is configured to direct the separated fine particles and the flow of air away from the chamber while a coarse particle port disposed towards the bottom of the housing is configured to direct the separated coarse particles away from the chamber.

19 Claims, 4 Drawing Sheets

APPARATUS FOR REMOVAL OF FINE PARTICLES IN MATERIAL FLOW SYSTEM

BACKGROUND OF THE INVENTION

This invention relates to a particle separation system for a material processing machine and in particular to a system for separating fine particles from coarse particles prior to transport into an injection molding or extrusion machine.

Injection molding and extrusion devices typically load granular plastic material from a source, such as a material hopper into an injection machine where the material is melted and forced under pressure into a mold to form a finished product. The finished product is then separated from the scrap plastic portions. The scrap plastic portions are then reground (regrind material) and reused by mixing the regrind material with additional source material. Regrinding the scrap plastic creates fine particulate matter (fines), dust, and other contaminants. The regrind material is typically recycled by adding it to the source plastic material for reuse in the injection process. Since the regrind material contains fines, dust, and other contaminants, only a percentage of the source material may be composed of regrind. Although this percentage is completely dependent on the raw material being utilized and the requirements of the particular part being formed, for purposes of illustration, the percentage of required material may be for example, 20% to 40% of the source material. The reason for such a limitation is that a higher percentage of regrind material produces unacceptably high defect levels, due to either the loss of physical properties of the material or an increase in level of visual defects.

In the production of small parts, the percentage of scrap plastic created may be as great as 70% to 90% since the amount of plastic used to create the part may be small relative to the amount of the runner material (channels) and feed lines. Hence, a proportionately large amount of regrind material is available. In typical injection molding and extrusion devices, such regrind material cannot be fully utilized since the amount of fines found in the regrind limits the injection mixture to approximately 20% to 40% of the source material. The mechanism of many of the defects is the inconsistency of particle size in the regrind material. Larger particles of material may take a long time to melt completely. During this time, the fine dust particles may have become burned and degraded. Increasing the ratio of regrind to source material may reduce the yield of the final product. Unused regrind material may be stored for subsequent use or may be discarded. Clearly, such alternatives are inefficient and costly. If the regrind contained fewer fines, the percentage of regrind added to the source material could be increased, thus utilizing a greater portion of the regrind material.

Particle separators are known for use in grain handling and feed separation systems where grain is separated according to size. Particle separators are also used in material pulverizing devices to prevent fines and dust from escaping into the environment from the pulverizing device. Typical particle separators available for injection molding devices operate in batch mode. In batch mode, a quantity of source material is processed to separate the fines and dust from larger particles. The separated material is then loaded into a source hopper or other container for transport into the injection molding device. When all of the source material has been used the process must be repeated. However, cost effective particle separators are not available for injection molding devices which operate on-line, that is, on a continuous basis.

Accordingly, it is an object of the present invention to provide a particle separator which substantially overcomes the above problems.

It is another object of the present invention to provide a particle separator which separates fine particles and dust from more coarse particles.

It is yet another object of the present invention to provide a non-batch mode particle separator.

It is a further object of the present invention to provide a particle separator that is inexpensive and operates in equipment using a continuous flow of material.

It is still an object of the present invention to provide a particle separator for use in injection molding or extrusion equipment.

It is another object of the present invention to provide a particle separator which removes fines from a mixture of source material and regrind material so that a greater percentage of regrind material may be utilized.

SUMMARY OF THE INVENTION

The particle separator of one embodiment of the present invention is used in a material flow system, where the material flow system includes an airflow generator to generate a swirling flow of air and supply means for supplying material having coarse and fine particulate material. The particle separator includes a housing having a top portion and a bottom portion and a longitudinal axis extending from a center of the top portion to a center of the bottom portion and a chamber defined within the housing. An inlet disposed towards the top portion of the housing is in communication with the flow of air and the supply material and is in further communication with the chamber. The inlet is adapted to direct the flow of air and the supply material into the chamber where the chamber is adapted to facilitate swirling of the airflow and the supply material within the chamber.

A selectively permeable particle screen is disposed within the chamber and is adapted to separate the fine particles from the coarse particles by permitting the fine particles to pass through the screen while the coarse particles do not pass therethrough. An exhaust outlet in communication with the chamber and the housing is configured to direct the separated fine particles and the flow of air away from the chamber while a coarse particle port disposed towards the bottom of the housing is configured to direct the separated coarse particles away from the chamber.

BRIEF DESCRIPTION OF THE DRAWINGS

The features of the present invention which are believed to be novel are set forth with particularity in the appended claims. The invention, together with further advantages thereof, may best be understood by reference to the following description in conjunction with the accompanying drawings.

DETAILED DESCRIPTION OF THE INVENTION

Figure 1:
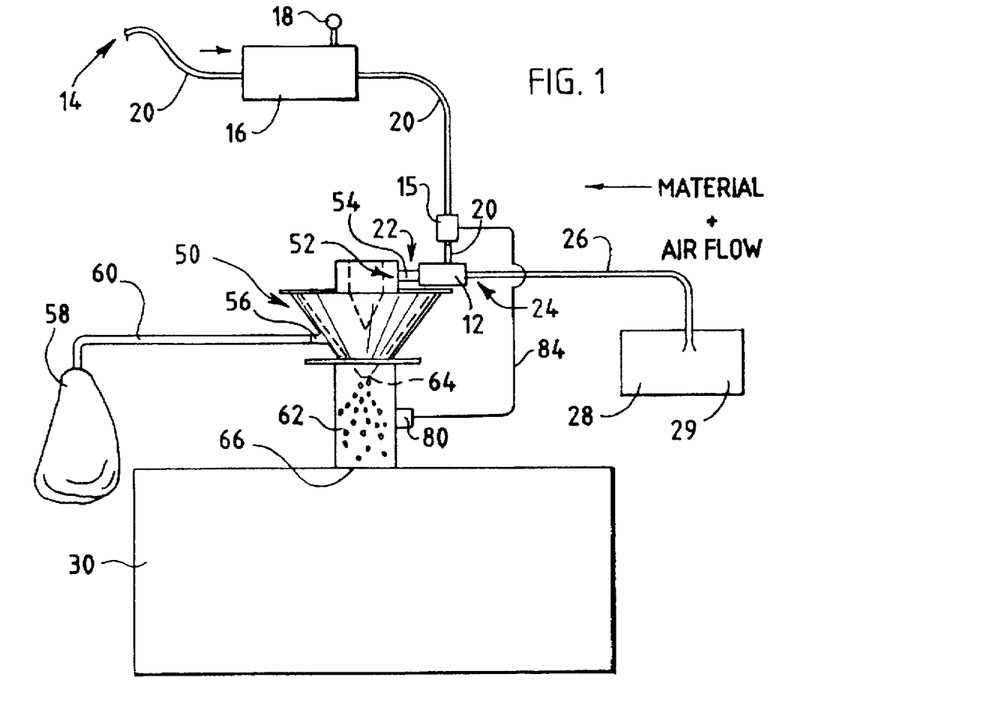
FIG. 1 is a schematic illustration of one embodiment of a material flow system of the present invention.

Referring now to FIG. 1, one embodiment of a material flow system such as is used in an injection molding process is shown generally as 10. The material flow system 10 includes an airflow generator 12 connected to a source of compressed air 14 which is fed through an air filter and pressure regulator combination 16 which may include a pressure gauge 18 attached thereto for indicating the level of air pressure. Flexible high pressure tubing 20 connects the source of compressed air 14 to the airflow generator 12 through the filter/regulator combination 16. The airflow generator 12, when connected to the source of compressed air 14 through an air solenoid valve 15, creates high pressure at an output 22 and a vacuum at its input 24.

The input 24 of the airflow generator 12 is connected through a feed tube 26 to a source material hopper 28. The source material hopper 28 contains plastic source material 29, typically in the form of coarse plastic pellets, which are used in the injection molding process and are subsequently melted down under pressure to form the final product.

Since a vacuum is created at the input 24 of the airflow generator 12, source material 29 transported from the source material hopper 28 and is fed into the input 24 of the airflow generator 12. A particle separator, shown generally as 50, includes an input port 52 connected directly to the output 22 of the airflow generator 12 through a tube 54 or other suitable connection mechanism. Alternatively, the output 22 of the airflow generator 12 may be connected directly to the input port 52 of the particle separator 50 and may be disposed in any suitable orientation relative thereto. Thus, the tube 54 may be eliminated in this embodiment.

The purpose of the airflow generator 12 is to create an air vortex or a swirling flow of air and to selectively withdraw or "suck-up" a quantity of the source material 29. The level of vacuum applied to the feed tube 26 may be restricted or regulated so that an appropriate quantity of the source material 29 may be transported through the airflow generator 12 and into the particle separator 50. However, the prime purpose of the airflow generator 12 is to create a vacuum at one end and high pressure at the other end such that the source material 29 is mixed in the airflow and directed into the particle separator 50. A circular airflow may be created within the particle separator 50 due to its circular shape. The airflow generator 12 may be for example, a Model 13445K75 Venturi sold by McMaster-Carr Corporation. However, any suitable device capable of creating a swirling flow of air and injecting particulate matter into the airflow may be used.

The source material 29 is carried in the airflow created by the airflow generator 12 and is received at the input port 52 of the particle separator 50. The particle separator 50 then separates the fine particulate matter and debris from the larger, more coarse particles in the source material 29. Such separation occurs due to the centrifugal force to which the particle are subjected and the differential in air pressure between the exhaust port 56 and the input port 52. Once separated, fine particulate matter, dust, and other contaminants are then vented through an exhaust port 56 of the particle separator 50 and into a collection bag 58 through an exhaust tube 60. The debris collected in the collection bag 58 or other suitable holding container may be disposed of accordingly.

The larger particles separated within the particle separator 50 fall towards the bottom of the particle separator and into a loading tube 62 disposed between an output 64 of the particle separator and the input 66 of the injection molding device 30. The separated coarse particles accumulate in and fill the loading tube 62 until the injection molding device 30 is ready to accept more raw material. When the loading tube 62 has filled to a sufficient level with coarse source material, a sensor 80 attached to the loading tube 62 activates the solenoid valve 15 attached to the airflow generator 12. Such activation may be accomplished electrically by means of a signal carried by a wire 84 or by any suitable means known in the art.

The solenoid valve 15, when deactivated, disconnects the flow of compressed air 14 to the airflow generator 12, thus halting the flow of air and source material into the particle separator 50. Accordingly, when the injection molding device 30 is ready to accept more raw material and the level of the source material 29 in the loading tube 62 is sufficiently low, the sensor 80 will activate the solenoid valve 15 to allow the flow of compressed air and material to continue. Thus, the process functions in an on-line manner eliminating the need for batch processing techniques.

The loading tube 62 may be formed from a clear plastic material such that the sensor 80 may use optical sensing techniques. However, any sensor capable to detecting a level of material in a tube may also be used.

Figure 2:
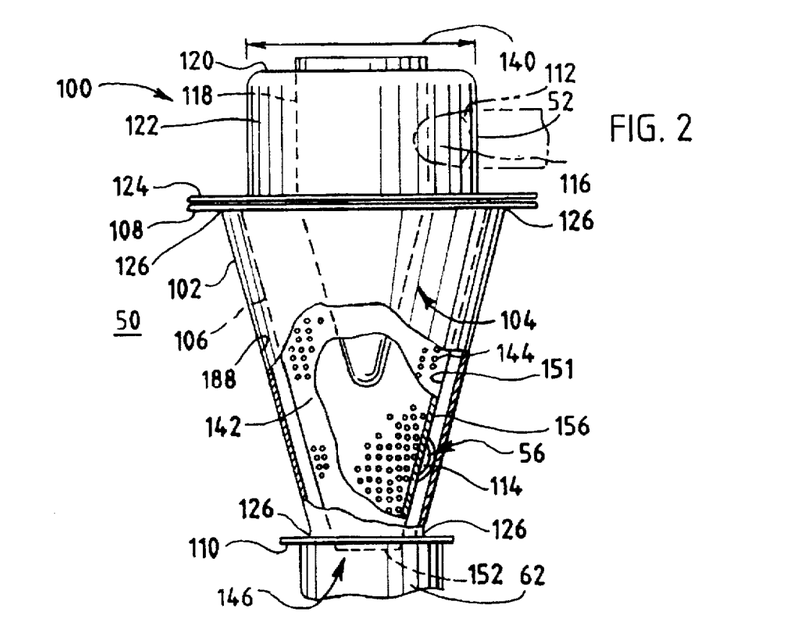
FIG. 2 is a side elevational sectional view of one embodiment of the particle separator shown in FIG. 1.

Referring now to FIG. 2, the particle separator 50 is shown in greater detail. The particle separator 50 includes a cover assembly 100, an outer shell 102, an inner cone 104, a particle screen 106, a top flange 108, a bottom flange 110, an injection nipple 112, and the exhaust port 56.

As described above in the illustrated embodiment, the swirling flow of air and the suspended source material 29 (FIG. 1) enter the particle separator 50 through the input port 52. The input port 52 interfaces with the cover assembly 100 by means of welds, bolts, or other suitable fastening means. The injection nipple 112 integrally formed from the input port 52 extends within the cover assembly 100 and has a curved aperture 116 so that the airflow and suspended particles circulate within the cover assembly in a circular motion.

The cone 104 has a cylindrical base portion 118 affixed to a top portion 120 of the cover assembly 100 by means of a weld or other suitable fastening means, thus forming a substantially air-tight fit. The base portion 118 of the cone 104 may protrude through the top portion 120 and is concentrically disposed within the cover assembly 100. The cone 104 and its base portion 118 form an air rotation structure within the cover assembly 100 such that a circular donut-shaped chamber 122 is formed within the cover assembly 100 between upstanding walls 123 of the cover assembly 100 and the base portion 118 of the cone 104. Airflow and suspended particles when injected into the cover assembly through the injection nipple 116 are propelled in a circular manner through the circular chamber 122 and around the cone 104 and its base portion 118.

A radially projecting lip 124 disposed toward the bottom of the cover assembly 100 provides means for fastening the cover assembly 100 to the top flange 108. The outer shell 102 is a hollow conically shaped structure where the top flange 108 is welded to its upper end and the bottom flange 110 is welded to its lower end. The weld points are shown diagrammatically as 126 and may be contiguous around the circumference of the outer shell 102. However, other suitable methods may be used for securing the flanges 108, 110 to the outer shell 102 such as spot welds, rivets, chemical adhesives, and the like.

The cover assembly 100 fits over and into the outer shell 102 such that the lip 124 of the cover assembly 100 mates with the upper flange 108 of the shell 102. The lip 124 and the upper flange 108 may be fastened together with bolts, rivets, or other means well known in the art. The upper flange 108 contains a central circular aperture, the diameter of which is approximately equal to the outside diameter 140 of the cover assembly 100. When the cover assembly 100 is affixed to the outer shell 102, the cone 104 passes through the aperture 128 of the upper flange 108 such that the circular chamber 122 is in communication with the internal volume 142 of the outer shell 102. Thus, airflow and suspended particles injected into the cover assembly freely circulate within the circular chamber 122 and the outer shell.

The conical particle screen 106 is selectively permeable and includes a plurality of holes 144 and is concentrically disposed within the outer shell 102 between the shell wall 102 and the cone 104. The particle screen 106 is vertically secured within the outer shell 102 between the upper flange 108 and the lower flange 110. The lower flange 110 contains a circular central aperture 146 through which a portion of the bottom of the screen 106 passes. The diameter of the aperture 146 in the lower flange 110 is such that a small portion of the length of the particle screen 106 protrudes through the aperture so that the screen 106 is firmly engaged. Thus, the particle screen 106 is secured within the outer shell 102 between the two flanges 108, 110. The particle screen 106 may be formed from wire mesh, sheet metal having holes, or any other suitable structure adapted to pass particles of a predetermined size therethrough.

Figure 3A:
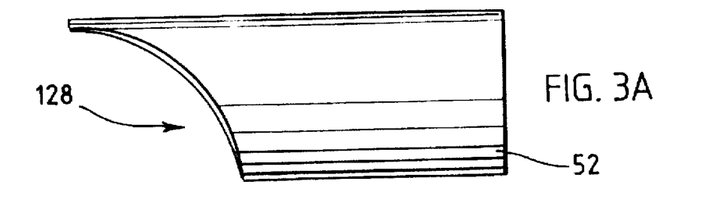
FIG. 3A is side elevational view of one embodiment of an injection nipple used in the separator shown in FIG. 2.
Figure 3B:
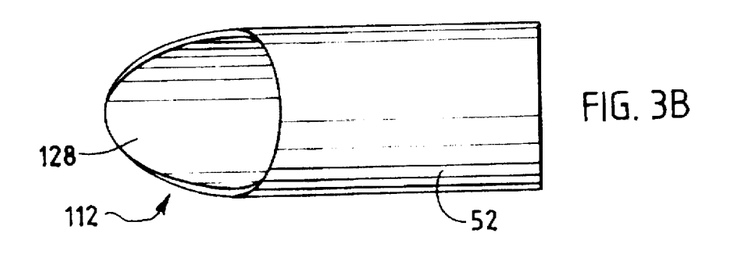
FIG. 3B is a top elevational view of one embodiment of the injection nipple used in the separator shown in FIG. 2.

Referring now to FIGS. 2, 3A, and 3B, FIGS. 3A and 3B show the injection nipple 112 extending from the input port 52 and integrally formed therewith. The input port 52 and the injection nipple 112 penetrate the side wall 123 of the cover assembly 100 and extend within the circular chamber 122. The curved aperture 116 of the injection nipple 112 is configured to direct the airflow and suspended particles in a circular motion around the base portion 118 of the cone 104 within the circular chamber 122.

Figure 4:
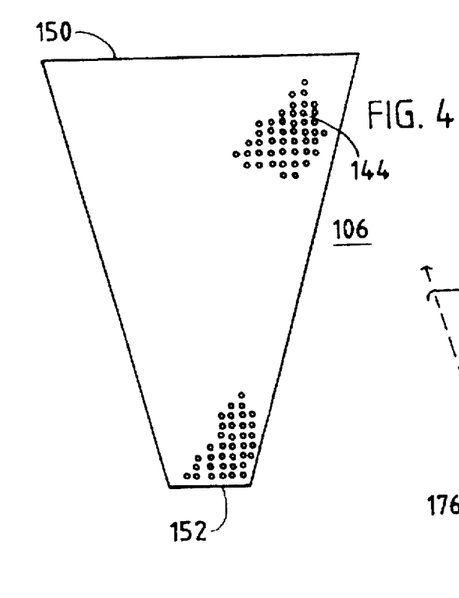
FIG. 4 is a side elevational view of the particle screen shown in FIG. 2.

Referring now to FIG. 4, the particle screen 106 is conically shaped and is open at both a top end 150 and a bottom end 152. The particle screen 106 contains a plurality of holes 144 which may, for example, range between 0.0625 inches to 0.125 inches in diameter. The spacing between the holes 144 may range, for example, between 0.125 inches to 0.1875 inches. Accordingly, the open percentage of the particle screen 106 may range from approximately 23% open to 40% open. The particle screen 106 may be constructed from 16 gauge steel or from any other suitable material. However, the dimensions of the holes 144 are not limited to the examples described above and may be appropriately sized to the dimensions of the particles to be filtered. Any suitable screen is expected to contain uniform sized holes and hole spacing. The difference in hole size and hole spacing may be varied to accommodate a variety of filtration requirements depending on the type of raw materials used, the condition of the granulating equipment, and/or the requirements of the finished product.

Referring back to FIG. 2, in operation, the particle separator 50 functions as follows. The flow of air and suspended particles are injected into the cover assembly 100 through the injection nipple 112 extending from the input port 52. Source material 29 (FIG. 1) containing coarse and fine particles circulate around the base portion 118 of the cone 104 within the circular chamber 122. The taper of the cone 104, the outer shell 102, and the particle screen 106 facilitate the circular airflow. As the particulate matter circulates within the outer shell 102, the particles essentially scrape against an inside surface 154 of the particle screen 106. This may cause fine particles attached to coarse particles to separate from the coarse particles so that they may pass through the plurality of holes 144 in particle screen 106. Additionally, unattached fine particles suspended in the airflow are also free to pass through the plurality of holes 144. Once the fine particles pass through the plurality of holes 144, they become trapped in the space defined between an outside surface 156 of the particle screen 106 and an inside wall 158 of the outer shell, and tend to remain in that space due to airflow mechanics. The fine particles so trapped are able to exit the shell 102 through the exhaust port 56 disposed towards the lower portion of the outer shell. The larger particles circulating within the internal volume 142 of the shell 102 cannot pass through the particle screen 106 eventually drop towards the bottom of the particle screen and fall through the open bottom end 152 of the particle screen. The bottom end 152 of the particle screen 106 essentially feeds the larger particles which are not capable of passing through the plurality of holes 144 into the loading tube 62. Although a small percentage of fine particles may also pass through the bottom end 152 of the particle screen 106, the vast majority of the fine particles pass through the plurality of holes 144 and are vented through the exhaust port 114 to be collected and/or discarded.

The particle separator 50 utilizes the circular flow of air to suspend particles within the volume 142 of the outer shell 102 where such suspension allows substantially all of the fine particles to pass through the plurality of holes 144 in the particle screen 106 where they are subsequently vented through the exhaust port 114.

Figure 5:
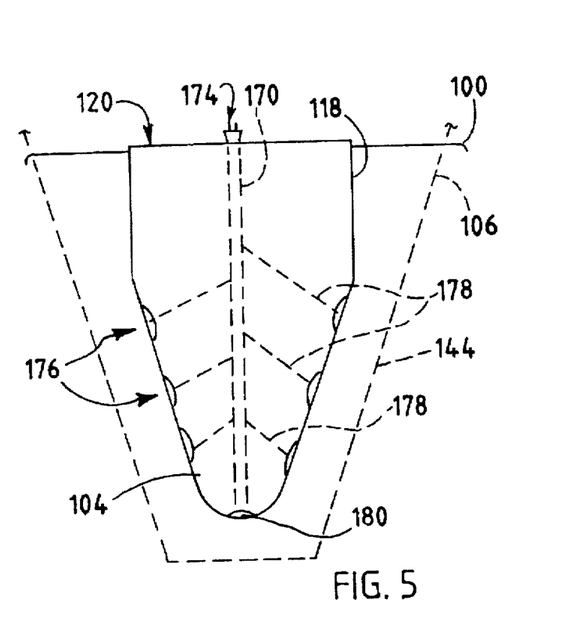
FIG. 5 is a side elevational assembly view of an alternate embodiment of the particle separator of the present invention, depicting an anti-static feature.

Referring now to FIG. 5, an alternate embodiment of the cone 104 is shown. Plastic particles which frictionally contact each other, as in a suspended airflow, tend to develop static charges. These static charges cause attraction between the large particles and the fine particles, thus reducing the probability that the fine particles will pass through the plurality of holes 144 in the particle screen 106. To neutralize the static charge on the particles, a static bar 170, such as static bars manufactured by Simco Company in the shape of the center cone 118 may be used in place of the solid cone. A high voltage for example, in the range of 4,000 to 7,000 volts A. C. (alternating current) at 5 microamps to 20 milliamps is placed at a conductor 174. The high A.C. electrical potential is conducted through wires 178 to ports 176 in the surface of the cone 118, while the conductive surface of the cone is maintained at ground potential. The high field differential between the wires 178 and the surface of the cone 118 causes charged ions to be directed away from the cone and into the air/material mixture. Since an A.C. supply is used, the ions are at times, positively charged, and at other times, are negatively charged. The mixture of free ions in the circulating air/material stream causes positive ions to be attracted to particles with a predominantly negative charge while negative ions are attracted to particles with a predominantly positive charge, thereby neutralizing the static charges on the circulating particles.

Once the charge on the material particles is neutralized, particles more easily separate thus, fine particles pass more easily through the plurality of holes 144 in the particle screen 106. The ports 176 in the cone 118 typically range between ¼ and ½ inches. Pressure in the circulating chamber 122 (FIG. 2) is prevented from escaping through the ports 176 by sealing the cone 118 from the atmosphere either at the top portion 120 or at the ports 176, with a non-conductive sealing material, such as plastic. If the cone 118 is sealed at the top 120, a small opening 180 disposed towards the tip 104 of the cone may be included to allow the escape of any particles that inadvertently enter through the ports 176.

Figure 6A:
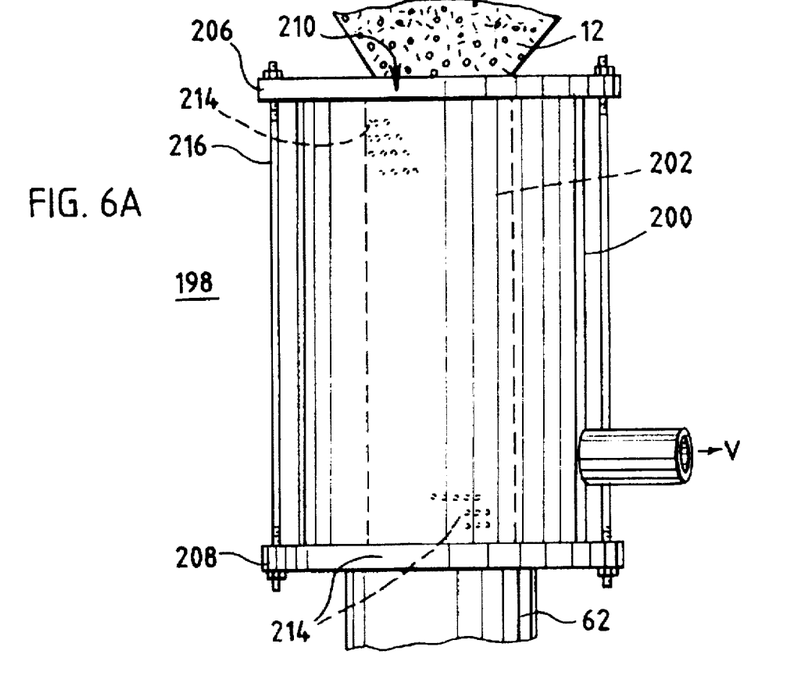
FIG. 6A is a side elevational view of an alternate embodiment of the particle separator of the material flow system shown in FIG. 1.
Figure 6B:
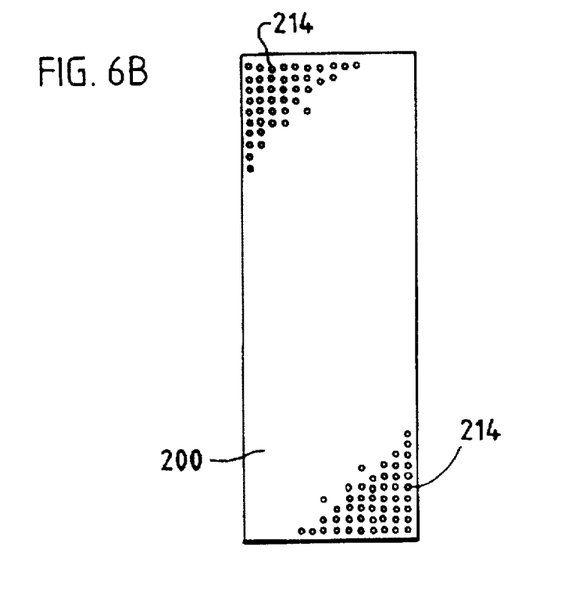
FIG. 6B is a side elevational view of a particle screen used in the particle separator shown in FIG. 6A.

Referring now to FIGS. 6A and 6B. FIG. 6A shows an alternate embodiment of a particle separator 198. In this embodiment, the particle separator 198 is cylindrical rather than conical in shape. The particle separator 198 includes a tubular shell 200 which may be formed from PVC tubing or piping or other suitable material. The particle separator 198 also includes a cylindrically shaped tubular particle screen 202 that is concentrically disposed within the tubular shell 200. An exhaust port 204 is provided to vent the small particles separated within the particle separator 198. A top flange 206 and a bottom flange 208 similarly restrain and confine the tubular particle screen 202 within the tubular shell 200. The particle separator 198 functions in the same way as the particle separator 50 shown in FIG. 1.

However, in this embodiment the airflow generator 12 (FIG. 1) may be seated directly on top of the upper flange 206 such that the output 22 (FIG. 1) of the airflow generator is directed into an aperture 210 concentrically disposed in the top flange 206. Thus, the swirling flow of air and suspended particulate matter are directed into the particle separator 198 through the flange 206 into a central portion 212 of the particle screen 202.

As the fine and coarse particles circulate within the screen 202 the fine particles are able to pass through a plurality of holes 214 in the particle screen 202. The particle screen 202 in this illustrated embodiment is similar to the screen shown in FIG. 4 except for its shape. Similarly, fine particles which exit the particle screen 202 are vented from the tubular shell 200 through the exhaust port 204 for subsequent disposal or recovery. The larger particles that cannot pass through the particle screen 202 drop down towards the bottom of the screen and fall through an aperture 214 concentrically disposed in the bottom flange 208. The bottom flange 208 may be secured to the loading tube 62 such that the coarse particles drop directly into the loading tube. In this illustrated embodiment, the airflow generator 12 must generate a sufficient air vortex to sustain rotation of the airflow within the particle separator 198.

The top flange 206 and the bottom flange 208 may be secured to either end of the tubular shell 200 to retain the particle screen 202 therebetween by a plurality of rods 216 which may be bolted to the flanges 206, 208. Alternatively, the flanges may have threaded fittings to accept the rods, as is well known in the art. Circular channels or grooves within the flanges may also be used to retain the tubular screen 202 and the shell 200 in a properly spaced orientation.

Figure 7:
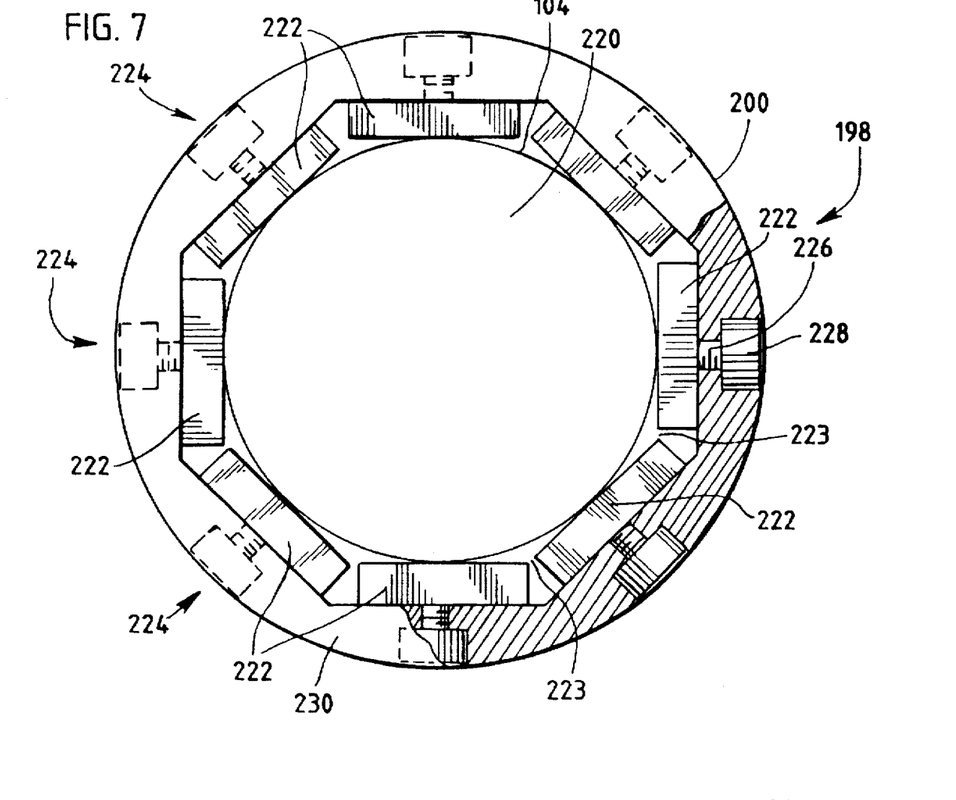
FIG. 7 is a top plan view of an alternate embodiment of a particle screen.

Referring now to FIG. 7, an alternate embodiment of a particle screen 220 is shown. In this alternate embodiment, the outer shell 102 and the inner cone 104 are the same as in the particle separator 198 shown in FIG. 2. However, in this embodiment, the particle screen 220 is not constructed from a wire mesh or other similar material, but rather is formed from a plurality of eight or more rectangular elongated bars 222. The rectangular bars 222 are parallel to each other and extend vertically from the bottom of the outer shell 102 towards the top of the shell.

The gap between each rectangular bar provides an aperture 223 through which the fine particles may pass. Thus, the vertical gap 223 between each rectangular bar 222 functions similarly to the plurality of holes in the screen shown in FIG. 6B. An adjustable socket mechanism 224 may be affixed to each rectangular bar positions each bar such that the gap 223 between each bar is adjustable. Allowing the gap between each bar to be adjustable on an individual basis allows the particle separator 50 to be modified depending upon the size of the particles in the material process. Each socket 224 may include a screw 226 or bolt attached to the rectangular bar 222 to govern movement of the blades. A yoke 230 disposed within the outer shell 200 (FIG. 6A) holds each bar 222 in exact position. Adjustment of the width of the bars allows for variation of the gap 223 between the bars 222. This allows for adjustment of the size of particles to be exhausted from the mechanism 198. The number of bars 222 is not limited to eight, and any suitable number of bars may be used. The yoke may be constructed from molded plastic, aluminum, or any other suitable material. Alternatively, each blade may be retained at a fixed position with a fixed gap therebetween.

Figure 8:
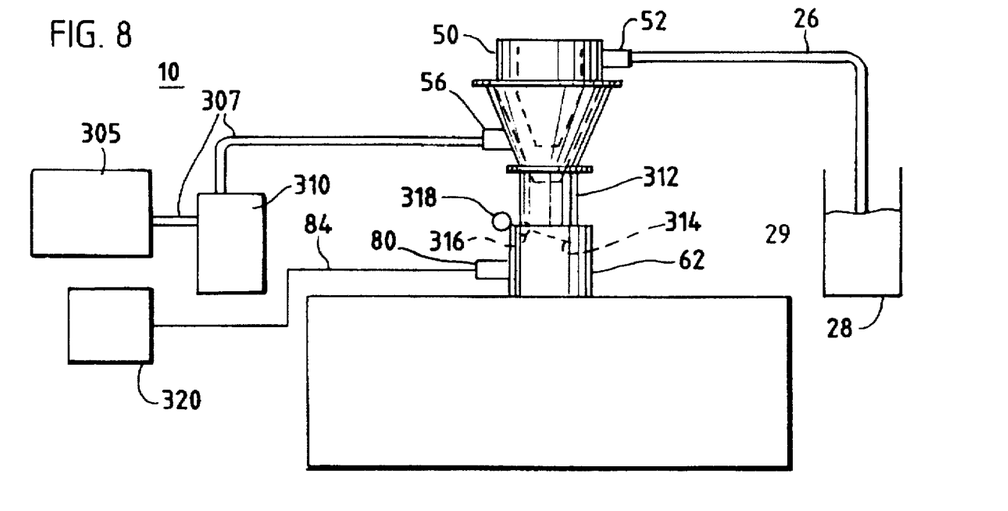
FIG. 8 is a schematic illustration of an alternate embodiment of a material flow system.

Referring now to FIG. 8, an alternate embodiment of the material flow system 10 is shown. Structures identical to structures shown in FIG. 1 are given like reference numerals. The particle separator 50 receives the source material 29 through the supply hose 26 to inlet port 52 through vacuum action. Instead of using a venturi device as an airflow generator, a central vacuum pump 305 creates the vacuum. When vacuum hoses 307 and a filter element 310 have been evacuated, the separator 50 and a loading chamber 312 will also become evacuated. The vacuum created within the loading chamber 312 causes a seal plate 314 to pivot at a pivot point 316 assisted by a counterbalance 318 such that a seal against the bottom of the chamber is achieved. Once the loading chamber 312 and separator 50 have been evacuated, air and material 29 will be drawn through the supply hose 26.

Material 29 is drawn into the separator and fines are removed through the screen 142 (FIG. 2) as described above. Coarse material falls through the bottom of the screen 142 and into the loading chamber 312. Fines which pass through the screen exit with exhaust air via the outlet port 56. Fines are trapped in the filter element 310 after traveling through the vacuum lines 307. The level of applied vacuum continues for a time predetermined by a system controller 320. Once the time has elapsed, the vacuum is terminated thus, halting the flow of material through the system 10. Termination of vacuum and the weight of material in the chamber 312 causes the seal plate 314 to pivot to an open position allowing the material to be deposited into the load tube 62. Sufficient material is deposited into the load tube 62 so that the sensor 80 informs the central controller 320 that no more material is needed. When the sensor 80 indicates that more material is required, the loading process is repeated.

This system is suitable for injection molding and extrusion facilities. The central vacuum pump 305 and the central controller 320 may load material to as many as 20 to 150 separate molding or extrusion machines.

Specific embodiments of a particle separator in a material flow system have been described for the purpose of illustrating the manner in which the invention may be made and 
used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. A particle separator for a material flow system, the material flow system having an airflow generator to generate a flow of air and to provide supply material having coarse and fine particulate material to the particle separator, the particle separator comprising:

a housing having a top portion and a bottom portion and a longitudinal axis extending from the top portion to the bottom portion;

a chamber defined within the housing, said chamber formed by an outer shell having a substantially solid surface and an inner shell disposed within the outer shell in a spaced relation thereto, the inner shell having a substantially solid surface and having a cross-sectional contour similar to the cross-sectional contour of the outer shell;

an inlet disposed towards the top portion of the housing, the inlet in communication with the flow of air and the supply material and in communication with the chamber, said inlet configured to direct the flow of air and the supply material into the chamber;

said outer shell and inner shell configured to facilitate swirling of the airflow and the supply material within the chamber;

a selectively permeable particle screen disposed between the outer shell and the inner shell, said particle screen configured to separate the fine particles from the coarse particles by permitting the fine particles to pass through the screen while the coarse particles do not pass therethrough;

an exhaust outlet in communication with the chamber and the housing and configured to direct the separated fine particles and the flow of air away from the chamber; and a coarse particle port disposed towards the bottom portion of the housing and configured to direct the separated coarse particles away from the chamber.

2. The particle separator of claim 1 wherein the selectively permeable particle screen is configured to surround the inner shell in a fixed spaced relationship relative thereto such that fine particles suspended in the flow of air between the inner shell and the particle screen pass through the particle screen and exit the chamber through the exhaust outlet while coarse particles do not pass through the particle screen and fall towards the bottom of the housing into the coarse particle port.

3. The particle separator of claim 1 wherein the particle screen comprises a mesh screen through which only particles smaller than predetermined size pass.

4. The particle separator of claim 1 wherein the particle screen comprises a sheet material having a plurality of holes through which only particles smaller than a predetermined size pass.

5. The particle separator of claim 1 wherein the particle screen is cone-shaped.

6. The particle separator of claim 1 wherein the particle screen is cone-shaped such that walls of the particle screen are substantially parallel to the surface of the inner shell.

7. The particle separator of claim 1 further including an injection nipple attached to the inlet configured to direct the flow of air in a circular motion between the inner shell and the outer shell.

8. The particle separator of claim 1 wherein the particle screen includes a plurality of substantially parallel bars coaxially disposed around the longitudinal axis of the housing and configured to surround the inner shell, said bars remaining in a fixed spaced relationship relative to the inner shell and having a fixed gap between adjacent bars through which only particles smaller than a predetermined size pass.

9. A particle separator for a material flow system, the material flow system having an airflow generator to generate a flow of air and to provide supply material having coarse and fine particulate material to the particle separator, the particle separator comprising:

a housing having a top portion and a bottom portion and a longitudinal axis extending from the top portion to the bottom portion:

a chamber defined within the housing;

an inlet disposed towards the top portion of the housing, the inlet in communication with the flow of air and the supply material, and in communication with the chamber, said inlet configured to direct the flow of air and the supply material into the chamber;

said chamber configured to facilitate swirling of the airflow and the supply material within the chamber:

an air rotation circulator disposed towards the top portion of the housing and having a cone-shaped portion, said circulator in communication with the chamber and configured to facilitate the flow of air directed into the chamber in a circular motion within the chamber such that the supply material tends to remain suspended in the airflow;

a selectively permeable particle screen disposed within the chamber configured to separate the fine particles from the coarse particles by permitting the fine particles to pass through the screen while the coarse particles do not pass therethrough:

an exhaust outlet in communication with the chamber and the housing and configured to direct the separated fine particles and the flow of air away from the chamber: and a coarse particle port disposed towards the bottom portion of the housing and configured to direct the separated coarse particles away from the chamber.

10. The particle separator of claim 9 wherein the selectively permeable particle screen is configured to surround the air rotation circulator in a fixed spaced relationship relative thereto such that fine particles suspended in the flow of air between the circulator and the particle screen pass through the particle screen and exit the chamber through the exhaust outlet while coarse particles do not pass through the particle screen and fall towards the bottom of the housing into the coarse particle port.

11. The particle separator of claim 9 wherein the particle screen comprises a mesh screen through which only particles smaller than predetermined size pass.

12. The particle separator of claim 9 wherein the particle screen comprises a sheet material having a plurality of holes through which only particles smaller than a predetermined size pass.

13. The particle separator of claim 9 wherein the particle screen is cone-shaped.

14. The particle separator of claim 9 wherein the particle screen is cone-shaped such that walls of the particle screen are substantially parallel to walls of a portion of the air rotation circulator.

15. The particle separator of claim 9 further including an injection nipple attached to the inlet adapted to direct the flow of air in a circular motion about the air rotation circulator.

16. The particle separator of claim 9 wherein the particle screen includes a plurality of substantially parallel bars coaxially disposed around the longitudinal axis of the housing and configured to surround the air rotation circulator, said bars remaining in a fixed spaced relationship relative to the circulator and having a fixed gap between adjacent bars through which only particles smaller than a predetermined size pass.

17. The particle separator of claim 16 wherein the particle screen includes a bar adjustment mechanism configured to adjust the fixed space between the bars.

18. The particle separator of claim 16 wherein the bars are substantially rectangular in shape and are coaxial with the longitudinal axis of the housing.

19. The particle separator of claim 9 wherein the particle separator is placed in the material flow system at a point before the supply material is introduced to an injection molding or an extrusion device such that only the supply material of a predetermined size is introduced into the injection molding or an extrusion device.

* * * * *